Figure 1:
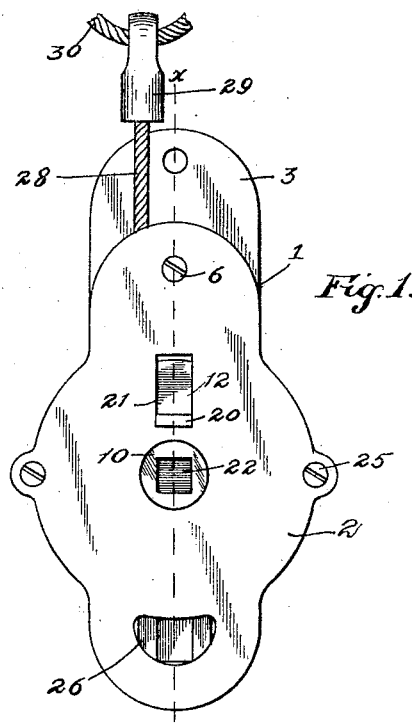

No. 765,204. PATENTED JULY 19, 1904.
C. P. SEARLES.
REEL.
APPLICATION FILED MAR. 3, 1904.
NO MODEL.

WITNESSES:
H. B. Bradshaw
M. B. Schle

INVENTOR
Charles P. Searles
BY
Shepherd & Parker
ATTORNEYS

No. 765,204. Patented July 19, 1904.

UNITED STATES PATENT OFFICE.

CHARLES P. SEARLES, OF COLUMBUS, OHIO.

REEL.

SPECIFICATION forming part of Letters Patent No. 765,204, dated July 19, 1904.

Application filed March 3, 1904. Serial No. 196,324. (No model.)

*To all whom it may concern:*

Be it known that I, CHARLES P. SEARLES, a citizen of the United States, residing at Columbus, in the county of Franklin and State of Ohio, have invented a certain new and useful Improvement in Reels, of which the following is a specification.

My invention relates to a new and useful improvement in cord-reels, and particularly to that class of devices known as "awning-cord" reels.

The object of my invention is to provide a single reel which may be connected with the several ends of the ropes of an ordinary swing-awning, whereby the same may be controlled by the reel.

Among other objects is the provision of a simple and effective locking means by which the reel may be held against rotation.

Finally, the object of my invention is to provide a device of the character described which will be strong, durable, and efficient, simple and comparatively inexpensive to construct, and one in which the working parts are not liable to get out of order.

With the above and other objects in view the invention consists in the novel details of construction and operation, a preferable embodiment of which is described in the specification and illustrated in the drawings, wherein—

Figure 2:
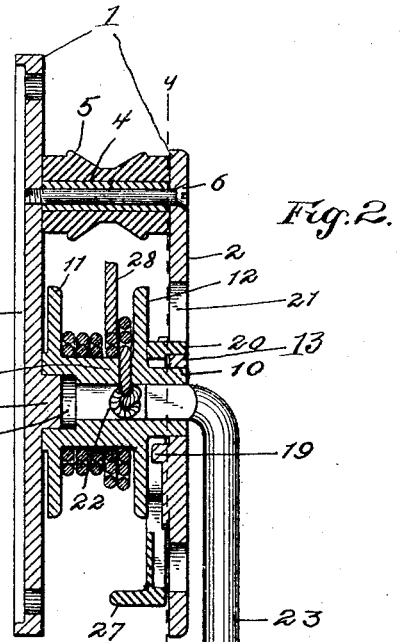
Figure 3:
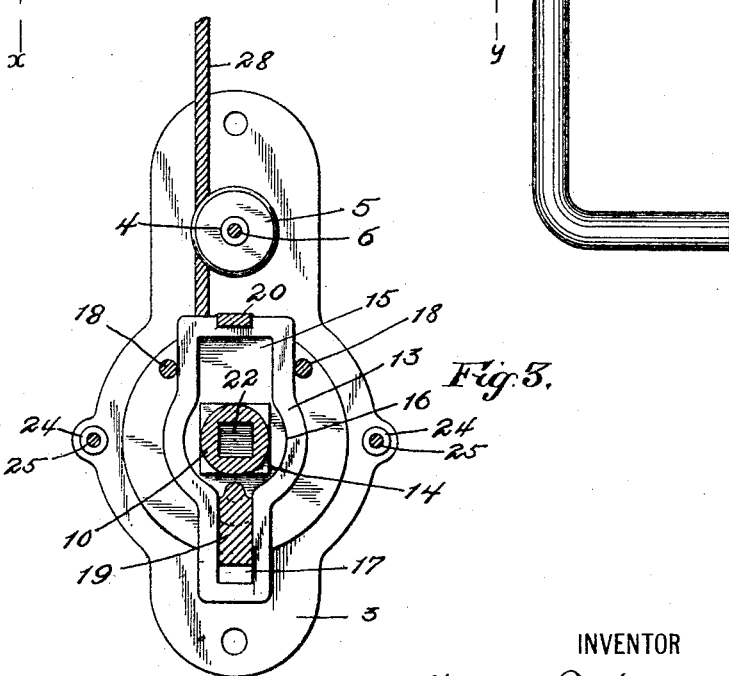

Figure 1 is a front elevation showing the reel-cord connected to the awning. Fig. 2 is a transverse vertical sectional view taken on line *x x* of Fig. 1, and Fig. 3 is a vertical sectional view taken on line *y y* of Fig. 2.

In the drawings the numeral 1 designates the reel-housing, which comprises the front plate 2 and back plate 3. Rotatably mounted between the plates upon a sleeve 4 is an idle sheave 5. The sleeve 4 is supported upon a screw-bolt 6, by which it is held in fixed relation to the plates. The back plate 3 is formed with a bearing-boss 7, upon which is mounted the recessed end 8 of a spool 9. The spool is extended axially and formed with a bearing-collar 10, which rotates in an aperture formed in the front plate 2. The spool 9 is formed with flanged sides 11 and 12, the sides 12 being set back some distance from the front plate 2 to permit the free passage of a locking-bail 13, which is adapted to be moved up and down, so as to engage or disengage with the squared portion 14 of the spool. The bail 13 is formed with an elongated opening comprising the enlarged portion 15, the rounded central portion 16, and the narrower end portion 17. The bail is held in position and actuated between studs 18, placed upon each side thereof, and is held against lateral displacement by the boss 19, which engages in the contracted portion 17, and also through the lug 20, which projects into the slot 21, formed in the face of the front plate 2. The spool is formed with an angular opening 22, into which is inserted the end of a crank 23, by which the spool is turned. The front and back plates 2 and 3 are further secured together by means of sleeves 24, through which pass screw-bolts 25, and the front plate 2 is formed with a semicircular opening 26. The bail 13 is formed with a finger-piece 27, by which it is manipulated. It is obvious that when the bail is in its lowermost position, as shown in Fig. 2, the squared portion 14 of the spool will lie in the rectangular opening 15, completely filling the same, and thus being held against rotation, as the bail is prevented from moving laterally by the boss 19 and the lug 20. In order to release or unlock the spool, it is merely necessary to raise the bail 13 to the position shown in Fig. 3, where the squared portion will stand in the central enlarged opening 16, and thus be free to rotate, the upward movement of the bail being limited by the slot 21, thus insuring an exact positioning of the parts. Secured to the spool, coiled therearound and passing outwardly against the idle sheave 5, is a cord 28, which carries at its upper end a suitable eye 29, through which pass the awning-ropes 30. This eye is large enough to accommodate two or more ropes, and thus it will be readily seen that by simply winding or unwinding the spool the awning may be raised or lowered.

Having now fully described my invention, what I claim, and desire to secure by Letters Patent, is—

1. In a reel, a housing comprising a front and a back plate, a spool rotatably supported between the plates, a locking-bail slidably engaging with the spool, and having a locking portion and a releasing portion and means for guiding the locking-bail.

2. In a reel, a housing comprising a back plate formed with a bearing-boss, a front plate formed with a guide-slot and a bearing-aperture, a spool having a squared portion and an extended bearing-collar fitting in the bearing-aperture and rotatably mounted on the bearing-boss, a locking-bail having a rectangular and circular opening and a guide-slot, a lug carried by the bail and engaging in the slot of the front plate, a sheave supported between the plates, and means for rotating the spool.

CHARLES P. SEARLES.

In presence of—
  C. C. SHEPHERD,
  W. L. MORROW.